(12) United States Patent
Bilger et al.

(10) Patent No.: US 8,390,633 B2
(45) Date of Patent: Mar. 5, 2013

(54) MEMORY FOR PROVIDING A GRAPHIC CONTENT

(75) Inventors: Christoph Bilger, Munich (DE); Rex Kho, Holzkirchen (DE); Achim Schramm, Munich (DE); Martin Maier, Diessen (DE); Yann Zinzius, Unterhaching (DE); Armin Kohlhase, Neubiberg (DE)

(73) Assignee: Qimonda AG, Munich (DE)

( * ) Notice: Subject to any disclaimer, the term of this patent is extended or adjusted under 35 U.S.C. 154(b) by 1365 days.

(21) Appl. No.: 11/771,834

(22) Filed: Jun. 29, 2007

(65) Prior Publication Data
US 2009/0002383 A1 Jan. 1, 2009

(51) Int. Cl.
*G06T 1/60* (2006.01)

(52) U.S. Cl. ............................ 345/530; 345/568
(58) Field of Classification Search .......... 345/530, 345/568
See application file for complete search history.

(56) References Cited

U.S. PATENT DOCUMENTS

| 4,965,753 | A  | * | 10/1990 | Kraemer ..................... 345/421 |
| 6,859,209 | B2 | * | 2/2005 | Lavelle et al. ............... 345/582 |
| 2005/0062747 | A1 | * | 3/2005 | Tuomi ......................... 345/506 |

* cited by examiner

*Primary Examiner* — Maurice L McDowell, Jr.
(74) *Attorney, Agent, or Firm* — Patterson & Sheridan, LLP

(57) ABSTRACT

A memory device comprises a memory array and a processing device. The memory array is configured to store a graphic data set. The processing device is configured to initiate outputting of data of the graphic data set from the memory array and to combine the outputted data in response to a read request for providing a graphic content.

35 Claims, 3 Drawing Sheets

MEMORY FOR PROVIDING A GRAPHIC CONTENT

BACKGROUND OF THE INVENTION

Field of the Invention

The invention relates to providing graphical content.

BRIEF DESCRIPTION OF THE DRAWINGS

Various features of embodiments will become clear from the following description, taking in conjunction with the accompanying drawings. It is to be noted, however, that the accompanying drawings illustrate only typical embodiments and are, therefore, not to be considered limiting of the scope of the invention. The present invention may admit other equally effective embodiments.

DETAILED DESCRIPTION OF THE PREFERRED EMBODIMENT

Embodiments for providing a graphic content are explained in conjunction with the drawings. The provided graphic content may be displayed on a display screen or subjected to further processing.

Figure 1:
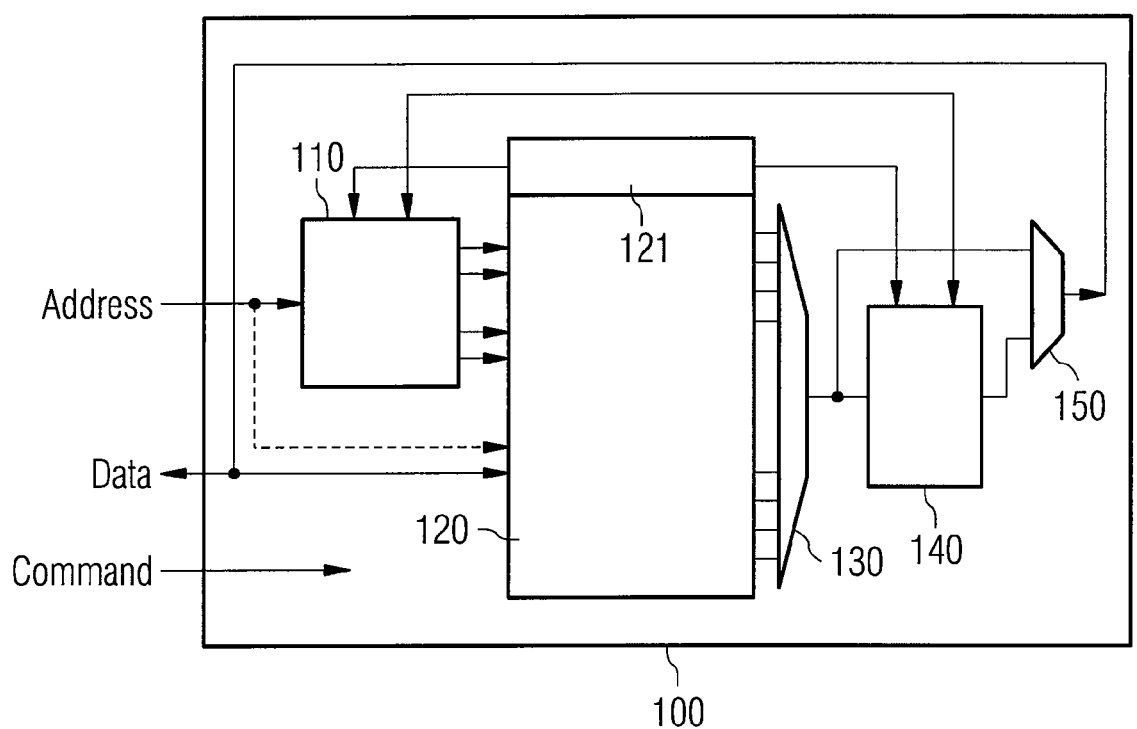
FIG. 1 illustrates a schematic view of a memory device.

FIG. 1 illustrates a schematic view of a memory device 100. The memory device 100 may be operated to provide a perspective correct projection of a three-dimensional image for a display screen, which is also referred to as volume rendering. The three-dimensional image may be an image reflecting information used for medical application, for example. An example hereof is a computer tomographic image. Moreover, three-dimensional images used in other application fields like e.g. a CAD image (Computer Aided Design) or an image representing a molecular visualization may be taken into account. With regard to the display screen, a two-dimensional display screen or a three-dimensional display screen may be considered.

The memory device 100 comprises an addressing unit 110, a memory array 120, a fetching unit 130, a combining unit 140 and a switching unit 150. These components of the memory device 100 are connected to each other by means of lines, e.g. address lines, data lines and control lines, which lines are indicated by arrows in FIG. 1. In this connection, the expression "line" refers to all possible elements and/or devices which may be used to transfer signals and/or information between components of the memory device 100, e.g. single conductors, a multiplicity of conductors, busses and wireless connections.

The memory device 100 further comprises data I/O ports (input/output) which are connected to external data lines and which serve for inputting and outputting data to and from the memory device 100, respectively. Moreover, the memory device 100 is connected to external command and address lines, by means of which commands and addresses are applied to the memory device 100. Further logic circuitry (not depicted) may be provided in the memory device 100, e.g. in order to receive and, as the case may be, to process commands and addresses from external.

The memory array 120 of the memory device 100 comprises a plurality of memory cells for storing data (not depicted). Possible types of memory cells include DRAM cells (Dynamic Random Access Memory), SRAM cells (Static Random Access Memory), flash memory cells as well as resistive memory cells like e.g. MRAM cells (Magneto-Resistive RAM). Moreover, memory cells of further memory types may be considered. In addition, the memory array 120 may comprise further circuitry components applied to store and output data to and from memory cells in the course of write and read operations. An example hereof are memory address decoders and sense amplifiers (not depicted).

The memory array 120 may be provided with a predefined memory area 121 for storing configuration data. By means of configuration data, the functionality and operating mode of the addressing unit 110 and the combining unit 140 may be configured. Accordingly, configuration data may be transferred from the memory area 121 of the memory array 120 to the addressing unit 110 and the combining unit 140, as indicated by arrows in FIG. 1.

For storing configuration data to the specific memory area 121 of the memory array 120, a write command indicating a common write access may be applied to the memory device 100. Furthermore physical memory addresses of a predefined memory address range relating to the specific memory area 121 are successively applied to the memory device 100. As indicated by the dashed line in FIG. 1, these memory addresses are directly applied to the memory array 120, in this way passing by the addressing unit 110. As a consequence, configuration data transmitted to and provided at the data I/O ports of the memory device 100 are successively stored to the memory area 121 of the memory array 120.

In an alternative operating mode of the memory device 100, storing of configuration data to the memory area 121 of the memory array 120 may be carried out by applying a specific write command to the memory device 100 which indicates a write access for storing only configuration data ("configuration data write command"). In this case, as well, memory addresses may be directly applied to the memory array 120 without intervention of the addressing unit 110.

Besides storing configuration data, a graphic data set for example constituting a three-dimensional image is stored to the memory array 120. The graphic data set comprises a plurality of picture elements, also referred to as voxels, which carry data information like e.g. color and/or transparency. The picture elements may be "arranged" in form of a plurality of image layers, as will be described further below.

For storing a date of a picture element of the three-dimensional image to the memory array 120, a write command indicating a common write access and a virtual address of the picture element representing its position in the three-dimensional image are applied to the memory device 100. The virtual address is applied to the addressing unit 110 which converts the virtual address to a physical memory address relating to the memory array 120. In this connection, the addressing unit 110 acts similarly to a memory management unit (MMU). The addressing unit 110 further transmits the converted memory address to the memory array 120. Thereby a date of the respective picture element transmitted to and provided at the data I/O ports of the memory device 100 is stored to the memory array 120. Consequently, by successively applying virtual addresses of picture elements and transmitting respective data to the memory device 100, the total graphic data set may be stored to the memory array 120.

In order to provide a graphic content for instance for a display screen, a read request is transmitted to the memory device 100. This operation may include applying a read command indicating a common read access and a virtual pixel address of a pixel of the display screen to the memory device 100. The virtual pixel address, which represents a position of the respective pixel on the display screen, is applied to the addressing unit 110. The addressing unit 110 hereupon determines virtual addresses of picture elements of the graphic data set associated with the requested graphic content for the addressed pixel in order to initiate outputting of data of respective picture elements from the memory array 120.

In order to determine virtual addresses of picture elements, the addressing unit 110 carries out a matrix operation applying transfer matrices, and, optionally a perspective division. This calculation is figuratively exemplified by the schematic illustration of FIG. 2.

Figure 2:
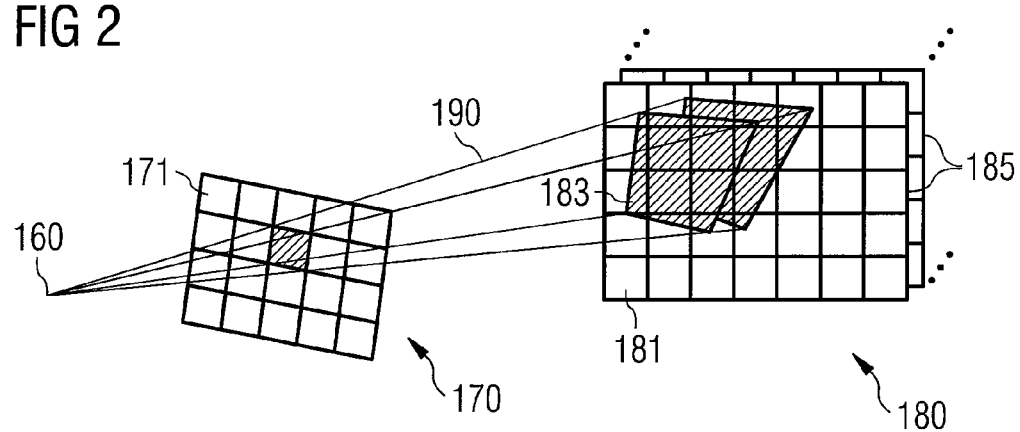
FIG. 2 schematically illustrates determining virtual addresses of picture elements of a three-dimensional image by means of a projected footprint of a pixel of a virtual display screen.

As depicted in FIG. 2, a three-dimensional image 180, a virtual display screen 170 and a virtual viewing point 160 are arranged in a virtual three-dimensional coordinate space. The virtual display screen 170, which corresponds to the above mentioned "real" display screen for displaying the requested graphic content, comprises a plurality of pixels 171. An addressed pixel 171 of the display screen 170 is marked shaded in FIG. 2. The three-dimensional image 180 comprises a plurality of picture elements 181 (voxels) reflecting color and transparency information. The picture elements 181 are arranged in form of a plurality of two-dimensional image layers 185. The layers 185 are arranged one after another, in this way constituting the three-dimensional image 180.

The matrix operation carried out by the addressing unit 110 of the memory device 100 is schematically illustrated by means of rays 190 emanating from the viewing point 160. The rays 190 define projected footprints 183 of the addressed pixel 171 on the layers 185 of the three-dimensional image 180. The footprints 183 of the addressed pixel 171 cover picture elements 181 of the different layers 185, whereby the picture elements 181 associated with the addressed pixel 171 of the display screen 170 and consequently the demanded virtual addresses of picture elements 181 may be determined. In particular, the addressing unit 110 may successively determine virtual addresses of picture elements 181 of the layers 185 in a viewing direction starting from the viewing point 160. Alternatively, determining virtual addresses of picture elements 181 may be carried out in the opposite viewing direction.

The transfer matrices, which depend on parameters like e.g. dimensions of the three-dimensional image 180, dimensions of the virtual display screen 170, a position of the viewing point 160 and of the display screen 170 relative to the three-dimensional image 180 in the three-dimensional coordinate space, may be calculated in advance by an external device and stored as configuration data in the memory area 121 of the memory array 120. For each of the layers 185 of the three-dimensional image 181, a respective transfer matrix may be provided.

Alternatively, calculation of the transfer matrices may be carried out by the addressing unit 110. In this connection, the aforesaid parameters applied to calculate the matrices are stored as configuration data in the memory area 121 of the memory array 120, and may be recalled by the addressing unit 110. The calculated transfer matrices may further be buffered in the addressing unit 110.

Having determined virtual addresses of picture elements 181 by means of the matrix operation, the addressing unit 110 further converts the determined virtual addresses to physical memory addresses, which are applied to the memory array 120 in order to initiate outputting of data of respective picture elements 181. In addition, the fetching unit 130 is being activated, thereby fetching data of picture elements 181 from the memory array 120 and transmitting the fetched data to the combining unit 140.

The memory array 120 may be configured for a parallel read-out of data. Accordingly, the fetching unit 130, which may e.g. be a multiplexer, may fetch data from the memory array 120 in a parallel way. Correspondingly, the addressing unit 120 may calculate and transmit converted memory addresses to the memory array 120 in a parallel way, as indicated by several arrows between the two units 110, 120 in FIG. 1. In particular, the addressing unit 110 may simultaneously transmit converted memory addresses, and the fetching unit 130 may simultaneously fetch data relating to picture elements 181 of a respective layer 185 of the three-dimensional image 180 covered by a projected footprint 183.

The thus fetched data is combined by the combining unit 140. For this purpose, the combining unit 140 carries out e.g. summation and/or multiplication operations on the outputted data values according to a predefined algorithm. Combining outputted data may additionally comprise filtering data by applying filter coefficients, e.g. anisotropic filtering. By means of filtering, effects like a fractional coverage of a projected footprint 183 on picture elements 181 of a layer 185 (cf. FIG. 2) may be taken into account.

The filter coefficients may be calculated by the addressing unit 110 in the course of determining virtual addresses of picture elements 181, and transmitted to the combining unit 140. As indicated by the bidirectional arrow between the addressing unit 110 and the combining unit 140 in FIG. 1, the combining unit 140 may also communicate with the addressing unit 110. For example, with regard to fetching of data of picture elements 181 of layers 185 acquired in a viewing direction starting from the viewing point 160 (cf. FIG. 2), the combining unit 140 may transmit a feedback signal to the addressing unit 110 in order to stop calculating further virtual addresses of picture elements 181 relating to an addressed pixel 171 of the display screen 170, with the feedback signal indicating that picture elements 181 covered by a projected footprint 183 on a layer 185 are all opaque. In such a case, no more data of picture elements 181 of further layers 185 arranged in the viewing direction are needed, because the final picture elements 181 constituting the graphic content of the addressed pixel 171 are determined. Moreover, further communication processes may be established between the addressing unit 110 and the combining unit 140 for the purpose of synchronizing the two units.

Data combined by the combining unit 140, which represents the requested graphic content, is further transmitted to the data I/O ports of the memory device 100 via the switching unit 150 and internal data lines. The thus provided graphic content may be retrieved and displayed on a display screen.

In order to provide the total graphic content of a display screen, virtual pixel addresses of all pixels of the display screen may be successively applied to the memory device 100. As a consequence, the memory device 100 successively outputs graphic data content associated with the respective pixels of the display screen. Apart from this operating mode, alternative read access modes of the memory device 100 may be conceived. As an example, the memory device 100 may be configured to successively output graphic content of all pixels of a display screen in response to applying a read command to the memory device 100 in conjunction with only one virtual pixel address of the display screen. Such a burst operating mode of the memory device 100 may also be realized on the basis of a specific burst read command.

The switching unit 150, which may e.g. be a multiplexer, may be used in order to output data from the memory device 100 without being subjected to combining operations. For this purpose, the switching unit 150 activates data lines passing by the combining unit 140. Such an operating mode, which makes it possible to output the original data of picture elements 181 or configuration data from the memory device 100, may e.g. be initiated by applying a read command in conjunction with respective virtual or physical memory addresses to the memory device 100.

The memory device 100 may be configured as a single memory chip. Alternatively, the memory device 100 may be a multi chip module. At this, the memory array 120 may be formed on a first die and the other components of the memory device 100 may be formed on a second die. Furthermore, other multi chip module configurations of the memory device 100 may be taken into account.

The memory device 100 may be used for dynamic graphic applications, which e.g. relate to mapping of movements in a three-dimensional space. For this purpose, the graphic data set and/or the transfer matrices or configuration data associated with the transfer matrices (e.g. position of a virtual viewing point, position of a virtual display screen) may be updated iteratively, so that graphic content successively outputted from the memory device 100 in response to respective read requests provides a dynamic effect.

Figure 3:
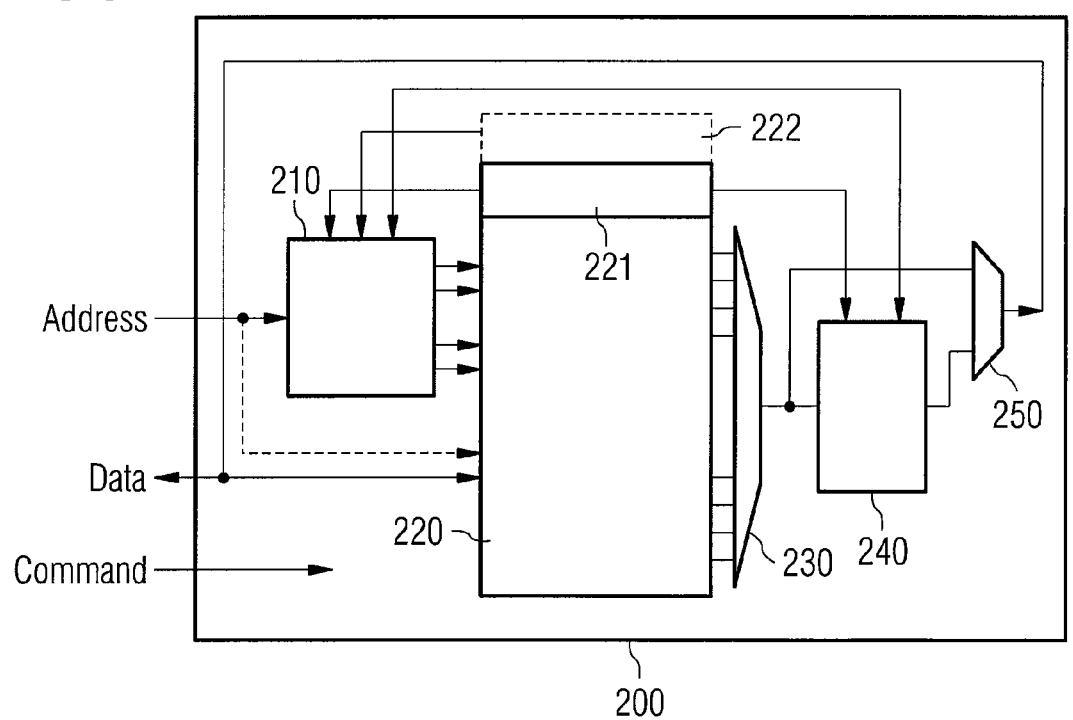
FIG. 3 illustrates a schematic view of a further memory device.

FIG. 3 illustrates a schematic view of a further memory device 200. The memory device 200 substantially comprises the same layout as the memory device 100 depicted in FIG. 1 and may be operated to provide a graphic content reflecting a two-dimensional texture perspectively projected on a three-dimensional scene or object, respectively. Such an operating mode, which e.g. relates to the field of computer games, is also referred to as texture mapping.

The memory device 200, as well, comprises an addressing unit 210, a memory array 220, a fetching unit 230, a combining unit 240 and a switching unit 250, which are connected to each other by means of lines. The memory device 200 comprises data I/O ports, by means of which the memory device 200 is connected to external data lines. Moreover, the memory device 200 is connected to external command and address lines. Further logic circuitry (not depicted) may be provided in the memory device 200, e.g. in order to receive and, as the case may be, to process commands and addresses from external.

The memory array 220 of the memory device 200 comprises a plurality of memory cells for storing data, and circuitry components applied to store and output data to and from memory cells (not depicted). With regard to possible types of memory cells, reference is made to the preceding description relating to the memory device 100 of FIG. 1. The memory array 220 may comprise a predefined memory area 221 for storing configuration data used for configuring the addressing unit 210 and the combining unit 240. The memory array 220 may optionally comprise a further predefined memory area 222 for storing data relating to a three-dimensional scene. This data, which represents vertices coordinates in a three-dimensional coordinate space, is referred to as vertices data in the following.

Storing of configuration data to the memory area 221 of the memory array 220 may be carried out by applying a write command indicating a common write access and successively applying physical memory addresses of a predefined memory address range relating to the memory area 221 of the memory array 220 to the memory device 200. The memory addresses may be directly applied to the memory array 220 without intervening of the addressing unit 210, whereby configuration data provided at the data I/O ports of the memory device 200 are successively stored to the memory area 221 of the memory array 220. Alternatively, storing of configuration data may be carried out by means of a specific write command indicating a write access for storing only configuration data. Analogue approaches apply as well to storing vertices data to the optional memory area 222 of the memory array 220, provided that it is intended to additionally hold vertices data in the memory device 200.

Moreover, a graphic data set is stored to the memory array 220. The graphic data set comprises a plurality of picture elements of a two-dimensional texture. The picture elements, in this case also referred to as texels, carry color information.

For storing a date of a picture element of the texture to the memory array 220, a common write command and a virtual address of the picture element representing its position in the texture are applied to the memory device 200. The virtual address is applied to the addressing unit 210 which converts the virtual address to a physical memory address relating to the memory array 220, and further transmits the converted memory address to the memory array 220. Thereby a date of the respective picture element provided at the data I/O ports of the memory device 200 is stored to the memory array 220. Consequently, by successively applying virtual addresses of picture elements and transmitting respective data to the memory device 200, the total graphic data set may be stored to the memory array 220.

In order to provide a graphic content for instance for a display screen, a read request is transmitted to the memory device 200. For this purpose, a read command and a virtual pixel address of a pixel of the display screen may be applied to the memory device 200. The virtual pixel address is applied to the addressing unit 210, which thereupon determines virtual addresses of picture elements of the graphic data set associated with the requested graphic content for the addressed pixel in order to initiate outputting of data of respective picture elements from the memory array 220.

The determination of virtual addresses of picture elements of the texture carried out by the addressing unit 210 is again based on a matrix operation. In this case, by means of the matrix operation, figuratively speaking a perspective correct projection of the texture on a virtual two-dimensional image layer, and a projection of a footprint of an addressed pixel of a virtual display screen on the virtual image layer may be carried out. The latter projection substantially corresponds to the footprint projection illustrated above with reference to FIG. 2, however, an addressed pixel is mapped on only one image layer.

The virtual image layer comprises a number of picture elements, wherein individual picture elements of the virtual image layer are "linked"—by means of the matrix operation—to vertices of the three-dimensional image scene. The perspective mapping of the texture on the virtual image layer therefore corresponds to establishing a link or assignment, respectively, between picture elements of the texture and picture elements of the virtual image layer.

Similar to the matrix operation figuratively depicted in FIG. 2, a projection of a footprint on the virtual image layer is dependent on parameters like e.g. dimensions of the virtual display screen and a position of a virtual viewing point and of the display screen relative to the virtual image layer in a three-dimensional coordinate space. A footprint of an addressed pixel of the virtual display screen covers picture elements of the virtual image layer, whereby the picture elements of the texture associated with the addressed pixel of the display screen and consequently the demanded virtual addresses of picture elements of the texture may be determined.

The aforesaid matrix operation may be carried out by the addressing unit 210 by applying only one transfer matrix. The transfer matrix, which in this case may be dependent on the parameters denoted above and additionally on the vertices of the three-dimensional image scene, may be calculated in advance by an external device and stored as configuration data in the memory area 221 of the memory array 220. Accordingly, since vertices data is not stored in the memory array 220, the memory array 220 may be realized without the memory area 222 reserved for holding vertices data.

Alternatively, calculation of the transfer matrix may be carried out by the addressing unit 210. In this connection, the aforesaid parameters and the vertices applied to calculate the transfer matrix are stored as configuration data and vertices data in the memory area 221 and in the memory area 222 of the memory array 220, respectively. The calculated transfer matrix may further be buffered in the addressing unit 210.

Following determination of virtual addresses of picture elements of the texture by means of the matrix operation, the addressing unit 210 converts the determined virtual addresses to physical memory addresses, which are applied to the memory array 220 in order to initiate outputting of data of respective picture elements. In addition, the fetching unit 230 is being activated, thereby fetching data from the memory array 220 and transmitting the fetched data to the combining unit 240.

The memory array 220 may be configured for a parallel read-out of data. Accordingly, both the fetching unit 230 may fetch data from the memory array 220 and the addressing unit 210 may calculate and transmit converted memory addresses to the memory array 220 in a parallel way. In particular, the addressing unit 210 may simultaneously transmit converted memory addresses, and the fetching unit 230 may simultaneously fetch data of picture elements associated with a footprint projected on the virtual image layer.

The fetched data is combined by the combining unit 240, which carries out e.g. summation and/or multiplication operations on the outputted data values according to a predefined algorithm. Combining outputted data may additionally comprise filtering data by applying filter coefficients. By means of filtering, effects like a "partial" linking between picture elements of the texture and of the virtual image layer, and a fractional coverage of a projected footprint on picture elements of the virtual image layer may be taken into account, which is also referred to as texture filtering and antialiasing.

The filter coefficients may be calculated by the addressing unit 210 in the course of determining virtual addresses of picture elements of the texture, and transmitted to the combining unit 240. Moreover, further communication may be established between the addressing unit 210 and the combining unit 240, e.g. for the purpose of synchronizing the two units, as indicated by the bidirectional arrow in FIG. 3.

Data combined by the combining unit 240, which represents the requested graphic content for the addressed pixel of the display screen, is further transmitted to the data I/O ports of the memory device 200 via the switching unit 250 and internal data lines. The thus provided graphic content may be retrieved and displayed on a display screen. The switching unit 250 may also be used in order to output data from the memory device 200 without being subjected to combining operations. For this purpose, the switching unit 250 activates a data path passing by the combining unit 240. Such an operating mode may e.g. be initiated by applying a read command and respective virtual or physical memory addresses to the memory device 200.

In order to provide the total graphic content of a display screen, virtual pixel addresses of all pixels of the display screen may be successively applied to the memory device 200, whereby the memory device 200 successively outputs graphic data content associated with the respective pixels. Alternatively, the memory device 200 may be configured to successively output graphic content of all pixels of a display screen in response to applying a read command to the memory device 200 in conjunction with only one virtual pixel address of the display screen. Such a burst operating mode of the memory device 200 may also be realized by means of a specific burst read command.

The memory device 200 may be configured as a single memory chip. Alternatively, the memory device 200 may be a multi chip module. At this, the memory array 220 may be formed on a first die and the other components of the memory device 200 may be formed on a second die. Furthermore, other multi chip module configurations of the memory device 200 may be taken into account.

The memory device 200 may be used for dynamic graphic applications, which e.g. relate to mapping of three-dimensional movements. For this purpose, the transfer matrix, vertices data or configuration data associated with the transfer matrix (e.g. position of a virtual viewing point, position of a virtual display screen) may be updated iteratively, so that graphic content successively outputted from the memory device 200 in response to respective read requests provides a dynamic effect.

Figure 4:
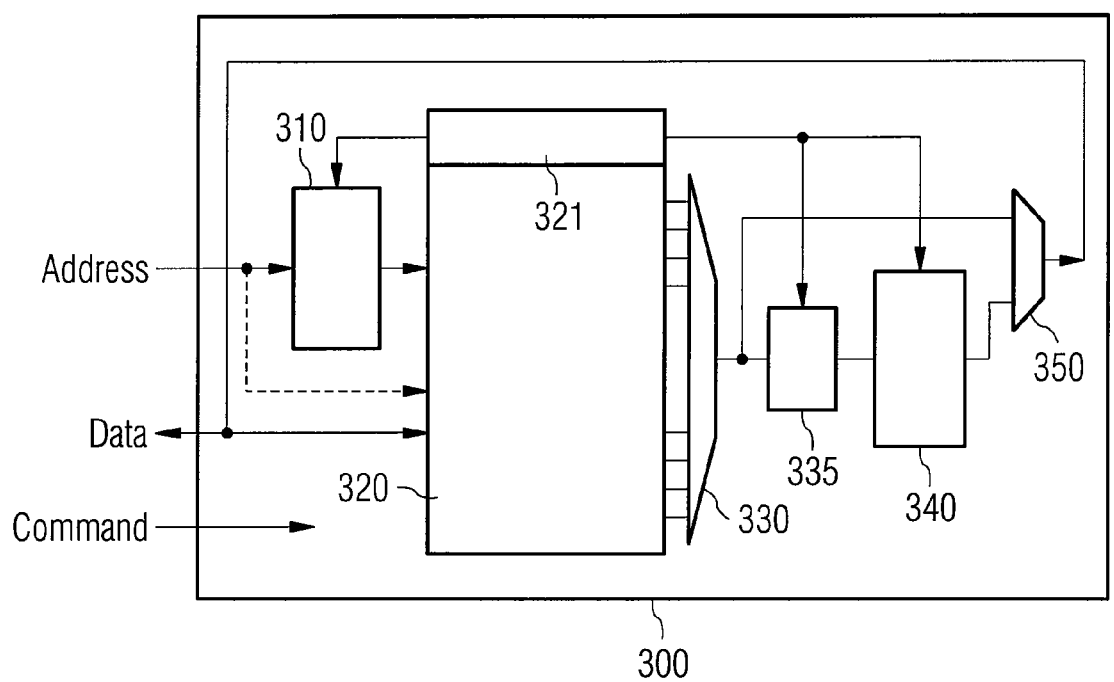
FIG. 4 illustrates a schematic view of yet another memory device.

FIG. 4 illustrates a schematic view of another memory device 300. The memory device 300 may be operated to provide a combination of the content of several image layers. Such an overlaying of image layers may for example be used in car infotainment or navigation systems. Moreover, combining of image layers may also be applied in consumer electronics, like e.g. LCD TV or game consoles.

The memory device 300 comprises an addressing unit 310, a memory array 320, a fetching unit 330, a color conversion unit 335, a combining unit 340 and a switching unit 350, which are connected to each other by means of lines. The memory device 300 comprises data I/O ports, by means of which the memory device 300 is connected to external data lines. Moreover, the memory device 300 is connected to external command and address lines. Further logic circuitry (not depicted) may be provided in the memory device 300, e.g. in order to receive and, as the case may be, to process commands and addresses from external.

The memory array 320 of the memory device 300 comprises a plurality of memory cells for storing data, and circuitry components applied to store and output data to and from memory cells (not depicted). With regard to possible types of memory cells, reference is made to the preceding description relating to the memory device 100 of FIG. 1. The memory array 320 may comprise a predefined memory area 321 for storing configuration data used for the purpose of configuring the addressing unit 310, the color conversion unit 335 and the combining unit 340.

Storing of configuration data to the memory area 321 of the memory array 320 may be carried out by applying a write command indicating a common write access and successively applying physical memory addresses of a predefined memory address range associated with the memory area 321 of the memory array 320 to the memory device 300. The memory addresses may be directly applied to the memory array 320 without intervening of the addressing unit 310, as indicated by the dashed line in FIG. 4, whereby configuration data provided at the data I/O ports of the memory device 300 are successively stored to the memory area 321 of the memory array 320. Alternatively, storing of configuration data may be carried out by means of a specific configuration data write command indicating a write access for storing only configuration data.

Besides storing configuration data, a graphic data set is stored to the memory array 320. The graphic data set constitutes several image layers, with each image layer comprising a plurality of picture elements. The picture elements of the image layers carry data information, like e.g. color and/or transparency.

For storing a date of a picture element of an image layer to the memory array 320, a common write command and a virtual address of the picture element representing its position in the respective image layer are applied to the memory device 300. The virtual address is applied to the addressing unit 310 which converts the virtual address to a physical memory address relating to the memory array 320. In this connection, the addressing unit 310 acts similarly to a memory management unit. The addressing unit 310 further transmits the converted memory address to the memory array 320. Thereby a date of the respective picture element transmitted to and provided at the data I/O ports of the memory device 300 is stored to the memory array 320. Consequently, by successively applying virtual addresses of picture elements and transmitting respective data to the memory device 300, the total graphic data set may be stored to the memory array 320.

The memory array 320 may be configured to store data of picture elements in such a way that a parallel outputting of data from the memory array 320, as described further below, is most effective. As an example, the memory array 320 may be divided into several sub-arrays or memory banks, respectively (not depicted). In a configuration like this, the number of sub-arrays agrees with the number of image layers of the graphic data set, so that data associated with each image layer may be stored in a respective one of the sub-arrays.

In order to provide a graphic content for instance for a display screen, a read request is transmitted to the memory device 300. For this purpose, a common read command and a virtual pixel address of a pixel of the display screen may be applied to the memory device 300. The virtual pixel address, which represents a position of the respective pixel on the display screen, is applied to the addressing unit 310. The addressing unit 310 hereupon determines virtual addresses of picture elements of the graphic data set associated with the requested graphic content for the addressed pixel in order to initiate outputting of data of respective picture elements from the memory array 320.

The determination of virtual addresses of picture elements carried out by the addressing unit 310 is based on a correlation between pixels of the display screen and picture elements of the image layers. The correlation is defined on the basis of parameters like e.g. dimensions of the display screen, dimensions of the image layers and a "virtual" orientation of the display screen relative to the image layers. These parameters are stored as configuration data in the memory area 321 of the memory array 320. The correlation may be figuratively illustrated by arranging the image layers "on top of each other", wherein the display screen is provided on top of the image layers and used to "see through" the arrangement of image layers.

With regard to an addressed pixel of the display screen, the addressing unit 310 assigns a correlated picture element in every image layer. In this way, the demanded virtual addresses of picture elements associated with the virtual pixel address of the addressed pixel may be determined.

Following determination of virtual addresses of picture elements by means of the correlation between pixels of the display screen and picture elements of the image layers, the addressing unit 310 converts the determined virtual addresses to physical memory addresses, which are applied to the memory array 320 in order to initiate outputting of data of respective picture elements. In addition, the fetching unit 330 is being activated, thereby fetching data from the memory array 320 and transmitting the fetched data to the color conversion unit 335 and the combining unit 340.

The memory array 320 may be configured for a parallel read-out of data. Correspondingly, both the fetching unit 330 may fetch data from the memory array 320 and the addressing unit 310 may calculate and transmit converted memory addresses to the memory array 320 in a parallel way. In particular, the addressing unit 310 may simultaneously transmit converted memory addresses, and the fetching unit 330 may simultaneously fetch data of picture elements of the different layers correlated with a respective pixel of the display screen.

The fetched data is transmitted to the color conversion unit 335. By means of the color conversion unit 335, data outputted from the memory array 320 representing color values of differing color resolutions may be converted into a consistent predefined color resolution. Moreover, differing modifications of color data like e.g. gamma correction and YUF color space may be converted or adjusted, respectively. If applicable, the color conversion unit 335 may also convert color data into the same linear color range. As a consequence, the color conversion unit 335 makes it possible to store color data to the memory array 320 having different color resolutions and/or manipulations.

Alternatively, a conversion of color data may be carried by means of an external device, whereby only color data comprising the same color resolution and/or modification is stored to the memory array 320 of the memory device 300. In such a case, the color conversion unit 335 may be omitted, whereby data fetched from the memory array 320 is directly transmitted to the combining unit 340.

The combining unit 340 furthermore combines the outputted data of picture elements of the image layers. For this, the combining unit 340 may be configured to combine the data by means of a hard-coded algorithm utilizing configuration settings stored in the memory area 321. For way of illustration, combining or blending of data carried out by the combining unit 340 may be based on a predefined blending value or on a transparent value stored with every picture element of the image layers. Moreover, combining of data may be carried out on the basis of a specific "transparent" image layer comprising picture elements carrying only transparency values. In addition, a so called color-keying or color-separation overlay algorithm like e.g. "greenscreen" or "bluescreen" may be established by means of the combining unit 340, which is based on predefined colors or a specific color-keying layer.

Alternatively, the combining unit 340 may be configured to combine the outputted data by means of an algorithm provided by a program. This allows for a more flexible combining of data by means of the aforesaid combining techniques. The program may be stored in the memory array 320, and transferred to and buffered in the combining unit 340 in advance. As an alternative, the program may also be stored in an embedded memory provided in the memory device 300 or in the combing unit 340, e.g. a static random access memory (SRAM).

Data combined by the combining unit 340, which represents the requested graphic content, is further transmitted to the data I/O ports of the memory device 300 via the switching unit 350 and internal data lines. The thus provided graphic content may be retrieved and displayed on a display screen.

In order to provide the total graphic content of a display screen, virtual pixel addresses of all pixels of the display screen may be successively applied to the memory device 300, whereby the memory device 300 successively outputs graphic data content associated with the respective pixels. Alternatively, the memory device 300 may be configured to successively output graphic content of all pixels of a display screen in response to applying a read command to the memory device 300 in conjunction with only one virtual pixel address of the display screen. Such a burst operating mode of the memory device 300 may also be realized by means of a specific burst read command.

The switching unit 350 may be used in order to output data from the memory device 300 without being subjected to color conversion and combining operations. For this purpose, the switching unit 350 activates data lines passing by the color conversion unit 335 and the combining unit 340. Such an operating mode, which makes it possible to output the original data of picture elements or configuration data from the memory device 300 may e.g. be initiated by applying a read command and respective virtual or physical memory addresses to the memory device 300.

The memory device 300 may be configured as a single memory chip. Alternatively, the memory device 300 may be a multi chip module. At this, the memory array 320 may be formed on a first die and the other components of the memory device 300 may be formed on a second die. Furthermore, other multi chip module configurations of the memory device 300 may be taken into account.

The memory device 300 may be used for dynamic graphic applications, which e.g. relate to movements or changes in the image layers. For this purpose, the graphic data set and/or configuration data may be updated iteratively, so that graphic content successively outputted from the memory device 300 in response to respective read requests provides a dynamic effect.

Figure 5:
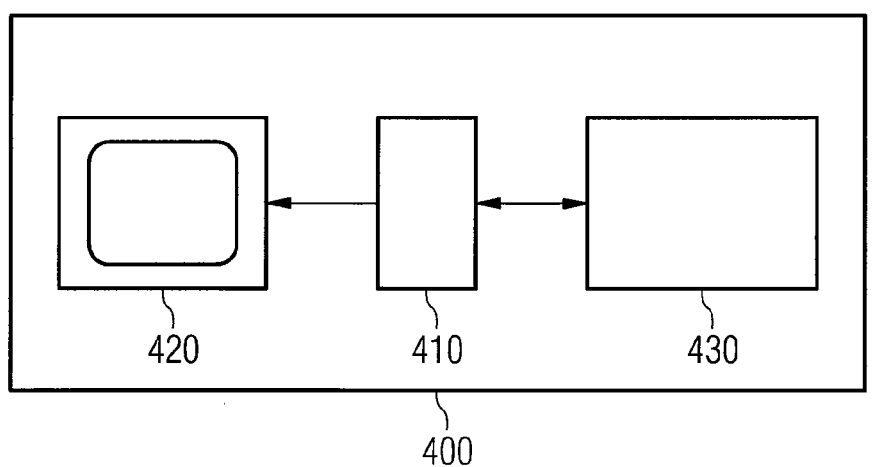
FIG. 5 illustrates a schematic view of a computer system.

FIG. 5 schematically illustrates the application of a memory device 430 in a computer system 400. The computer system 400 comprises, besides the memory device 430, a control device 410 and a display screen 420. These components of the computer system 400 are connected to each other by means of lines or buses, respectively, as indicated by arrows in FIG. 5. The memory device 430 may be one of the preceding memory devices 100, 200 and 300 described in connection with FIGS. 1 to 4. The display screen 420 may be a two-dimensional display screen or a three-dimensional display screen. The memory system 400 may comprise further components, e.g. devices for feeding data into the computer system 400 (not depicted).

The control device 410, which may e.g. be a graphics processing unit (GPU), is configured to control the above described write and read accesses. In this connection, the control device 410 may transmit write requests to the memory device 430 in order to store data (e.g. configuration data, vertices data, graphic data set) via the control device 410 to the memory device 430. Moreover, the control device 410 may transmit read requests to the memory device 430 in order to output a graphic content for the display screen 420 from the memory device 430. In addition, the control device 410 may carry out the above mentioned external operations like e.g. calculation of transfer matrices and conversion of color data.

With regard to a read access, the control device 410 may apply a read command and successively virtual pixel addresses of pixels of the display screen 420 to the memory device 430, in order to initiate outputting of graphic content associated with respective pixels from the memory device 430. Alternatively, the control device 410 may initiate a burst output of data. In response to the read access, the memory device 430 processes and combines data in order to provide and output the requested graphic content. By means of the control device 410, the thus provided graphic content is transmitted to and displayed on the display screen 420.

The configuration of the memory device 430 makes it possible to concentrate a major part of bandwidth intensive processing operations carried out in order to provide a final graphic content in the memory device 430. Consequently, in particular with regard to the above described dynamic applications, a high output rate of graphic content from the memory device 430 may be realized, which e.g. matches with the refresh rate of the display screen 420. The concentration of processing operations in the memory device 430 furthermore makes it possible to realize a relatively low power demand at the interface between the control device 410 and the memory device 430, which may be favorable to mobile applications.

The embodiments described in conjunction with the drawings are exemplary embodiments. Moreover, further embodiments may be realized which comprise modifications.

For instance, storing of data of picture elements of a graphic data set (e.g. three-dimensional image, texture, image layers) to a memory device may be carried out by applying physical memory addresses instead of virtual memory addresses to the memory device. In this case, as well, an addressing unit provided in the memory device may map between memory addresses and virtual addresses of picture elements.

Further, memory devices may be conceived which comprise several addressing units, thereby further favoring a parallel outputting of data from a memory array. For example, with regard to the memory device 100 depicted in FIG. 1, several addressing units 110 may be provided, wherein the number of addressing units 110 agrees with the number of image layers 185 of the three-dimensional image 180 (cf. FIG. 2). In this way, virtual addresses of picture elements 181 covered by footprints 183 of an addressed pixel 171 off all image layers 185 may simultaneously be determined, converted and applied to the memory array 120, so that the total data of picture elements 181 associated with the addressed pixel 171 may be simultaneously outputted from the memory array 120.

With regard to the computer system 400 depicted in FIG. 5, the computer system 400 is not limited to have only one memory device 430. The computer system 400 may comprise several memory devices 430, which may also be of a different type. As an example, the computer system may comprise memory devices 100 illustrated in FIG. 1 and memory devices 200 illustrated in FIG. 3. At this, a memory device 100 and a memory device 200 may be used to provide a combined perspective projection of a three-dimensional image represented by voxels and of a texture projected on a three-dimensional object, wherein the memory device 100 is operated to provide a projection of the three-dimensional image and the memory device 200 is operated to provide a projection of the texture.

The preceding description describes exemplary embodiments of the invention. The features disclosed therein and the claims and the drawings can, therefore, be useful for realizing the invention in its various embodiments, both individually and in any combination. While the foregoing is directed to embodiments of the invention, other and further embodiments of this invention may be devised without departing from the basic scope of the invention, the scope of the present invention being determined by the claims that follow.

What is claimed is:

1. A memory device, comprising:
a memory array configured to store a graphic data set that comprises a three-dimensional image, wherein the memory array comprises a predefined memory area for storing configuration data and/or vertices data;
an addressing unit configured to:
commence a determination of virtual addresses of picture elements of the graphic data set via a transfer-matrix, wherein the transfer-matrix depends on a viewing point of a virtual display screen and is stored as configuration data or is calculated by the addressing unit; and to,
upon receiving a transmitted feedback signal from a processing device, cease the determination of virtual addresses; and
the processing device configured, in response to a read request for providing a graphic content, to initiate outputting of data of the graphic data set from the memory array using the virtual addresses and to combine the outputted data, thereby providing the requested graphic content.

2. The memory device according to claim 1, further comprising a fetching unit, configured to fetch data of picture elements of the graphic data set in a parallel way from the memory array.

3. The memory device according to claim 1, wherein the addressing unit is configured to determine a virtual address of a picture element of the graphic data set on the basis of a virtual pixel address of a pixel of a display screen.

4. The memory device according to claim 3, wherein the virtual pixel address is included in the read request applied to the memory device.

5. The memory device according to claim 1, wherein the addressing unit is configured to convert a virtual address of a picture element of the graphic data set to a memory address of the memory array, which is applied to the memory array.

6. The memory device according to claim 1, wherein the addressing unit is configured to determine a virtual address of a picture element of the graphic data set by means of a matrix operation applying a transfer matrix.

7. The memory device according to claim 6, wherein the addressing unit is configured to calculate the transfer matrix.

8. The memory device according to claim 1, wherein the graphic data set constitutes a three-dimensional image, the three-dimensional image comprising layers having picture elements.

9. The memory device according to claim 8, wherein the addressing unit is configured to determine a virtual address of a picture element of a layer by calculating a projected footprint of a pixel of a display screen on the layer.

10. The memory device according to claim 1, wherein the graphic data set constitutes a texture comprising picture elements.

11. The memory device according to claim 10, wherein the addressing unit is configured to determine a virtual address of a picture element of the texture by calculating a perspective projection of the texture on an image layer and by calculating a projected footprint of a pixel of a display screen on the image layer.

12. The memory device according to claim 1, wherein the processing device comprises a combining unit which is configured to filter outputted data from the memory array by applying filter coefficients.

13. The memory device according to claim 12, wherein the addressing unit is configured to calculate the filter coefficients and to transmit the filter coefficients to the combining unit.

14. The memory device according to claim 1, wherein the graphic data set constitutes several image layers comprising picture elements.

15. The memory device according to claim 14, wherein the addressing unit is configured to determine a virtual address of a picture element of a layer on the basis of a correlation between a pixel of a display screen and the picture element of the layer.

16. The memory device according to claim 1, wherein the processing device is configured to combine outputted data of picture elements of the graphic data set by means of a hard-coded algorithm.

17. The memory device according to claim 1, wherein the processing device is configured to combine outputted data of picture elements of the graphic data set by means of an algorithm provided by a program.

18. The memory device according to claim 1, further comprising a color conversion unit which is configured to convert data outputted from the memory array representing a color into a predefined color resolution.

19. The memory device according to claim 1, wherein data outputted from the memory array represents a color and/or a transparency.

20. The memory device according to claim 1, configured to store a date of a picture element of the graphic data set to the memory array by applying a virtual address of the picture element to the memory device, wherein the addressing unit is configured to convert the virtual address to a memory address of the memory array, which is applied to the memory array.

21. A memory device, comprising:
a memory array which is configured to store a graphic data set that comprises a three-dimensional image, wherein the memory array comprises a predefined memory area for storing configuration data and/or vertices data;
an addressing unit, which is configured, in response to a read request for providing a graphic content applied to the memory chip, to:
determine virtual addresses of picture elements of the graphic data set via a transfer-matrix, wherein the transfer-matrix depends on a viewing point of a virtual display screen and is stored as configuration data or is calculated by the addressing unit; and to,
upon receiving a transmitted feedback signal from a combining unit, cease the determination of virtual addresses;
a fetching unit, which is configured to fetch the picture elements of the graphic data set from the memory array using the virtual addresses; and
the combining unit configured to combine the fetched data from the memory array, thereby providing the requested graphic content.

22. The memory device according to claim 21, wherein the fetching unit is configured to fetch data of picture elements of the graphic data set in a parallel way from the memory array.

23. The memory device according to claim 21, wherein the memory device is one of a memory chip and a multi chip module.

24. A memory chip, comprising:
a memory array which is configured to store a graphic data set that comprises a three-dimensional image, wherein the memory array comprises a predefined memory area for storing configuration data and/or vertices data;

an addressing unit, which is configured, in response to a read request for providing a graphic content applied to the memory chip, to:

determine virtual addresses of picture elements of the graphic data set via a transfer-matrix, wherein the transfer-matrix depends on a viewing point of a virtual display screen and is stored as configuration data or is calculated by the addressing unit; and to, upon receiving a transmitted feedback signal from a combining unit, cease the determination of virtual addresses;

a fetching unit, which is configured to fetch the picture elements of the graphic data set from the memory array using the virtual addresses; and the combining unit configured to combine the fetched data from the memory array, thereby providing the requested graphic content.

25. A computer system, comprising a control device and a memory device, the memory device comprising:

a memory array which is configured to store a graphic data set that comprises a three-dimensional image, wherein the memory array comprises a predefined memory area for storing configuration data and/or vertices data;

an addressing unit configured to:

commence a determination of virtual addresses of picture elements of the graphic data set via a transfer-matrix, wherein the transfer-matrix depends on a viewing point of a virtual display screen and is stored as configuration data or is calculated by the addressing unit; and to, upon receiving a transmitted feedback signal from a processing device, cease the determination of virtual addresses; and the processing device, which is configured, in response to a read request for providing a graphic content transmitted from the control device to the memory device, to initiate outputting of data of the graphic data set from the memory array using the virtual addresses and to combine the outputted data, thereby providing the requested graphic content.

26. The computer system according to claim 25, further comprising a display screen communicatively coupled with the processing device and configured to display the requested graphic content.

27. The computer system according to claim 25, wherein the control device is configured to transmit a burst read request to the memory device, and wherein the memory device is configured, in response to the burst read request, to provide a total graphic content of a display screen.

28. A method of operating a memory device, the memory device comprising a memory array for storing a graphic data set that comprises a three-dimensional image, an addressing unit, and a processing device, the method comprising the steps of:

applying a request for providing a graphic content to the memory device;

responsive to the request:

commencing, by the addressing unit, a determination of virtual addresses of picture elements of the graphic data set via a transfer-matrix, wherein the transfer-matrix depends on a viewing point of a virtual display screen and is stored as configuration data or is calculated by the addressing unit in order to initiate outputting of data of respective picture elements from the memory array, wherein the memory array comprises a predefined memory area for storing configuration data and/or vertices data, and to, upon receiving a transmitted feedback signal from the processing device, cease the determination of virtual addresses;

outputting, by the processing device, data of the graphic data set from the memory array using the virtual addresses;

combining the outputted data; and providing the requested graphic content.

29. The method according to claim 28, wherein a virtual address of a picture element of the graphic data set is converted to a memory address of the memory array by the processing device, and wherein the converted memory address is applied to the memory array.

30. The method according to claim 28, wherein determining a virtual address of a picture element of the graphic data set is carried out on the basis of a virtual pixel address of a pixel of a display screen.

31. The method according to claim 30, wherein the virtual pixel address is included in the read request.

32. The method according to claim 28, wherein determining a virtual address of a picture element of the graphic data set is carried out by means of a matrix operation applying a transfer matrix.

33. The method according to claim 28, wherein combining outputted data of picture elements comprises filtering of outputted data by applying filter coefficients.

34. The method according to claim 28, wherein data is outputted from the memory array in a parallel way.

35. The method according to claim 28, further comprising storing data of the graphic data set to the memory array, wherein virtual addresses relating to the graphic data set are applied to the memory device.

* * * * *